United States Patent [19]
Liebert et al.

[11] 4,395,877
[45] Aug. 2, 1983

[54] HYDROSTATIC STEERING SYSTEM FOR MOTOR VEHICLES

[75] Inventors: Karl-Heinz Liebert, Schwabisch Gmund; Werner Tischer, Bobingen, both of Fed. Rep. of Germany

[73] Assignee: Zahnradfabrik Friedrichshafen, AG., Friedrichshafen, Fed. Rep. of Germany

[21] Appl. No.: 114,383

[22] Filed: Jan. 22, 1980

[30] Foreign Application Priority Data

Feb. 17, 1979 [DE] Fed. Rep. of Germany ....... 2906183

[51] Int. Cl.³ .............................................. B62D 5/08
[52] U.S. Cl. .................................. 60/384; 137/625.24; 418/61 B
[58] Field of Search ..................... 60/384; 137/625.24; 418/61 B; 180/132

[56] References Cited

U.S. PATENT DOCUMENTS

| Re. 25,126 | 2/1962 | Charlson | 137/625.24 X |
| 3,819,307 | 6/1974 | Uppal | 137/625.24 X |
| 4,033,377 | 7/1977 | Johnson | 60/384 X |

FOREIGN PATENT DOCUMENTS

2253575 5/1974 Fed. Rep. of Germany.

*Primary Examiner*—Gerald A. Michalsky
*Attorney, Agent, or Firm*—Zalkind & Shuster

[57] ABSTRACT

Maximum angular displacement between the rotatable valve elements of a steering control valve is governed solely by the circular pitch of the piston gear associated with the metering gear pump in a hydrostatic fluid power steering system. A pair of fluid collecting manifolds in the control valve respectively communicate with the expanding and contracting pockets in the gear pump to form part of the flow paths between the gear pump and the fluid power steering motor.

3 Claims, 10 Drawing Figures

HYDROSTATIC STEERING SYSTEM FOR MOTOR VEHICLES

BACKGROUND OF THE INVENTION

This invention relates to hydrostatic steering systems for motor vehicles, especially vehicles of the articulated frame type. Cross reference is hereby made to prior copending application Ser. No. 79,838 filed Sept. 28, 1979, now U.S. Pat. No. 4,258,752 and Ser. No. 084,183, filed Oct. 12, 1979, now U.S. Pat. No. 4,295,805 owned in common with the present application by the same assignee.

The present invention is associated with a hydrostatic steering system of the type that includes a hand operated metering gear pump having an internally toothed stator enmeshed with the external teeth on a rotatable piston element operatively connected to the inner rotatable valve element of a steering control valve. The control valve also includes an outer rotatable valve element mounted in a valve body housing in concentric relationship to the inner valve element. The inner rotatable valve element is rotatable in opposite directions by the vehicle steering wheel to control the flow of fluid between a high pressure source and expanding and contracting fluid displacing pockets formed between the meshing teeth of the metering gear pump. A plurality of valve flow passages conducting fluid to and from the gear pump are controlled by two series of relatively movable apertures equal in number to twice the number of teeth associated with the rotatable piston element of the gear pump. Such a steering system is disclosed, for example, in German Pat. No. 2,253,575. In this type of steering system, the rotatable piston of the hand metering gear pump has four teeth while the stator has five teeth. Operation of such metering gear pump produces relatively large fluid pulsations causing a jerking movement in the operation of fluid steering motor connected to the control valve. Heretofore, these pulsations were reduced by increasing the number of teeth associated with the metering gear pump. Thus, the metering gear pumps according to current power steering practice are provided with rotatable pistons having six teeth and a stator having seven teeth. Attempts to further increase the number of teeth in the hand metering gear pump have resulted in an intolerable increase in production costs.

Where a stator having seven teeth is utilized, the valve housing is provided with seven passages to establish fluid communication between the tooth gaps of the stator and a first series of apertures extending through the cylindrical bearing surface of the housing journaling the outer rotatable valve element having a second series of apertures therein cooperating with the first series of apertures to control flow to and from the gear pump pockets. According to prior steering systems, the number of apertures in the second series were twice the number of teeth of the rotatable piston in order to accommodate steering in both directions. Where six teeth are utilized, twelve apertures spaced by 30° from each other were provided in the outer rotatable valve element. The inner valve element through which the steering direction is reversed, must have the same angular spacing for the apertures therein. Accordingly, the control apertures in the neutral position of the control valve for one of the valve elements are disposed centrally between the control apertures in the other of the valve elements. Thus, the maximum adjusting angle for the inner rotary slide valve element relative to the outer valve element was limited to 15° in both directions.

Where the steering system is to be used for self-propelled, heavy vehicles such as articulated frame vehicles, an adjusting angle for the control valve larger than 15° is required in order to reduce the sensitivity of the vehicle to rotational motion of the hand steering wheel. Otherwise, during rapid travel of the vehicle, the large masses of the articulated parts of the vehicle would oscillate about their hinged connection and impede smooth steering of the vehicle.

It is therefore an important object of the present invention to provide a hydrostatic steering system with greater flexibility in selecting the number of gear teeth provided for the hand metering gear pump in order to enable design of the steering system in accordance with criteria such as the quantity of fluid displaced, installational space, production costs, and fluid stream pulsation amplitude. An additional object of the present invention in accordance with the foregoing object is to provide the control valve associated with a hydrostatic steering system with cooperating series of control apertures angularly spaced by an amount suitable for the desired purpose and, in particular, for installations where angular spacing between the control apertures must be made larger than 15° in both directions even though a rotatable piston with seven or more external teeth is utilized.

SUMMARY OF THE INVENTION

In accordance with the present invention, a hydrostatic steering system of the aforementioned type is provided wherein the steering control valve is provided with two separate fluid connecting zones or manifolds, each one of which is in fluid communication with alternate ones of the control apertures formed in the outer rotary slide valve element. The two fluid collector manifolds are respectively connected by two groups of directional control passages formed in the inner rotary slide valve elements to the fluid steering motor by means of which a reversal in flow is effected corresponding to the steering direction. As a result of the foregoing arrangement, the amount of relative displacement of the rotary slide valve elements will depend only on the angular spacing between the teeth of the rotatable piston of the gear pump, inasmuch as the fluid displacing pockets are in continuous fluid communication with the two collector passages aforementioned, having no angle spacing limitations associated therewith. Control passages of the rotary slide valve elements are not therefore limited by any arbitrary angular spacing limits dictated by the two collector manifolds. Consequently, the stator and rotatable piston of the gear pump may be provided with the desired number of teeth and circular pitch corresponding to the desired adjusting angles for the rotary slide valve elements of the control valve. Circular pitches for the teeth of the gear pump of 45° to 60°, or 90°, may be provided, for example, corresponding to adjusting angles of $22\frac{1}{2}$°, 30° or 45° in opposite directions for the control valve.

In accordance with one embodiment of the invention, one of the fluid collector manifolds is formed by a chamber at one axial end of the valve elements and an inner chamber enclosed by the inner rotary slide valve element. An annular passage on the outer surface of the inner rotary slide valve element serves as the other collector manifold. In accordance with another embodiment of the invention, two annular passages on the outer surface of the inner rotary valve element serve as the collector manifolds.

BRIEF DESCRIPTION OF THE DRAWINGS

The invention is hereinafter described in detail with reference to the accompanying drawings, in which.

DETAILED DESCRIPTION OF PREFERRED EMBODIMENTS

Figure 1:
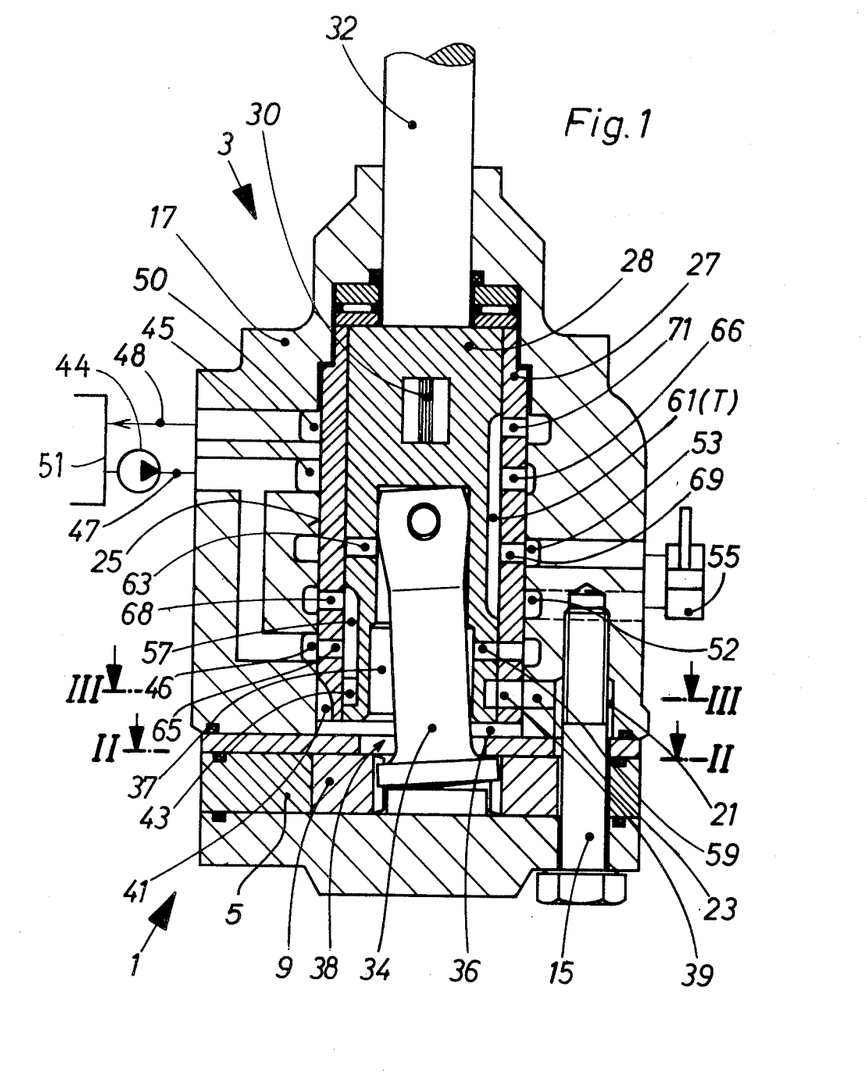
FIG. 1 is a longitudinal side section view through a control valve and gear pump assembly constructed in accordance with the present invention.
Figure 2:
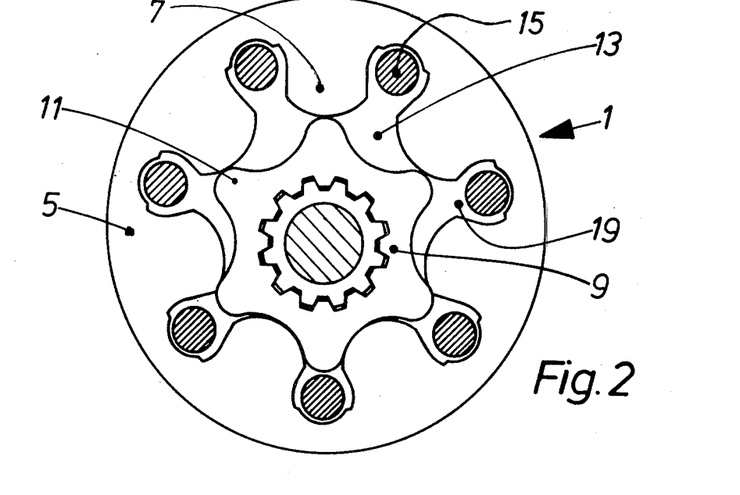
FIG. 2 is a transverse section view taken substantially through a plane indicated by section line II—II in FIG. 1.
Figure 3:
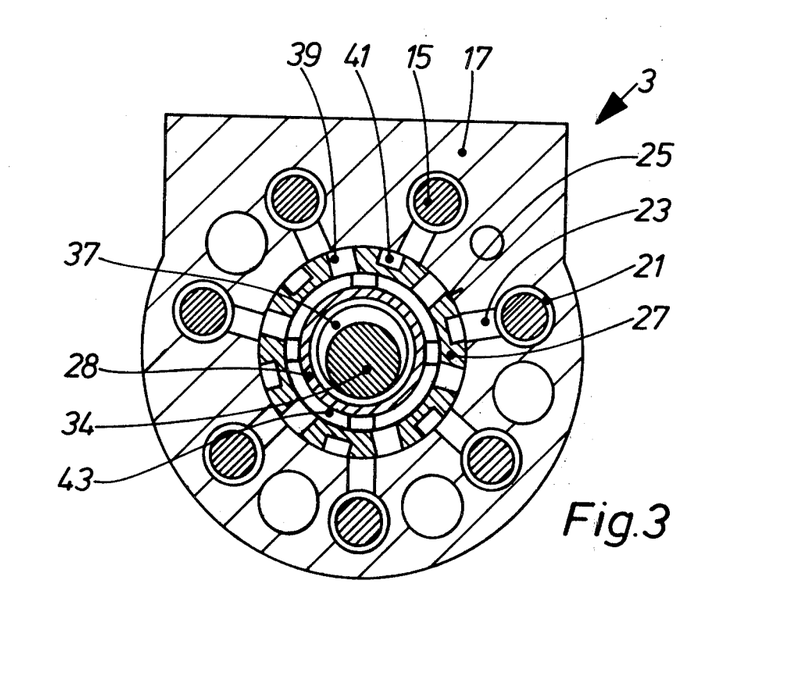
FIG. 3 is a transverse section view taken substantially through a plane indicated by section line III—III in FIG. 1.

Referring now to the drawings in detail, FIGS. 1, 2 and 3 illustrate a first embodiment of the invention which includes a hand operated metering gear pump generally referred to by reference numeral 1 and an associated control valve generally referred to by reference numeral 3. The hand metering pump 1 which may function as a rotary piston motor includes a stator 5 having seven internal teeth 7 and a rotatable piston 9 having six external teeth 11. As more clearly seen in FIG. 2, fluid displacing pockets 13 sealed from each other are formed between the teeth 7 and 11. During rotation of the piston 11, approximately half of the pockets 13 are undergoing volumetric expansion while the other pockets are undergoing volumetric contraction. The metering pump is attached by seven screw bolts 15 to a valve body housing 17 of the control valve 3. Each of the seven gaps 19 formed between the teeth 7 of the stator 5 is in fluid communication with one of seven axial flow passages 21 formed in the housing 17 surrounding each one of the screw bolts 15. The passages 21 extend to a first series of seven control apertures 23 which open into a central bore 25 of the housing 17. This central bore forms a cylindrical bearing surface journaling an outer rotary slide valve element 27 with little radial clearance. The valve element 27 has a central bore which in turn journals an inner rotary slide valve element 28 with little radial clearance. A centering spring 30 limits relative rotation between the valve elements. The inner rotary slide valve element 28 is fixed to a driving shaft 32 connected to a steering spindle (not shown) for rotation therewith. The outer rotary slide valve element 27 is operatively connected by a swivel pin and a drive shaft 34 to the rotatable piston 9 for rotation therewith but radially displaceable relative thereto. The swivel pin connection is more clearly shown in U.S. Pat. Nos. 4,258,752 and 4,295,805 aforementioned.

Disposed at one axial end of both rotary slide valve elements 27 and 28 as shown in FIG. 1, is a chamber 36 which is in fluid communication with an inner chamber 37 enclosed by the inner rotary slide valve element 28 to form a collector manifold 38. Six continuous and evenly distributed control apertures 39 are formed in the outer rotary slide valve element 27 for cooperation with the control apertures 23 in the housing to establish fluid connections to the expanding and contracting pockets 13 of the gear pump 1. The outer rotary slide valve element 27 is provided with six longitudinal control grooves 41 at one axial end angularly located centrally between adjacent control apertures 39. The control passages 39 and 41 jointly form a second series of apertures which cooperate with the first series of control apertures 23 in the valve housing 17 to control the flow of fluid. The control grooves 41 open into the chamber 36 and are thereby in fluid communication with the collector manifold 38. The inner rotary slide valve element 28 has an annular groove 43 formed therein which is in fluid communication with the control apertures 39 of the outer valve element. The annular groove 43 constitutes a second collector manifold.

The housing 17 as shown in FIG. 1, is provided with annular grooves 45 and 46 through which an inflow of pressurized fluid is received from an inlet conduit 47 connected to a high pressure pump 44. An annular groove 50 in the housing is connected by a fluid return conduit 48 to a reservoir tank 51. Another two annular grooves 52 and 53 in the housing are connected to opposing operating chambers of a fluid power steering motor 55 connected to the vehicle steering linkages.

Figure 5:
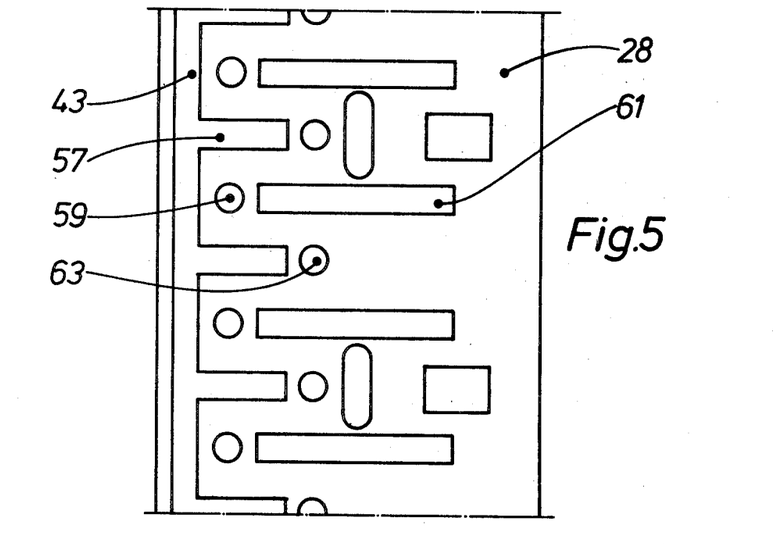
FIG. 5 is a planar projection of the external cylindrical surface of the inner rotary slide valve element showing the control passages therein.

As shown in FIG. 5, the inner rotary slide valve element 28 has four longitudinal grooves 57 formed therein and distributed evenly over the outer periphery of the valve element. The angularly spaced grooves 57 are all connected with the annular groove 43 as shown. Openings 59 in the inner valve element 28 are located centrally between adjacent grooves 57. The openings 59 are radial passages that extend completely through the rotary slide valve element and therefore establish fluid communication between the radially outer and inner cylindrical surfaces of the valve element as compared to the grooves in the radially outer surfaces of the valve elements that do not radially penetrate the valve element. The inner rotary valve element 28 is furthermore provided with angularly spaced grooves 61 which are axially aligned with the openings 59 as shown in FIG. 5. Radial passage openings 63 are also formed in the inner valve element 28 an axial alignment with the grooves 57 as shown.

Figure 4:
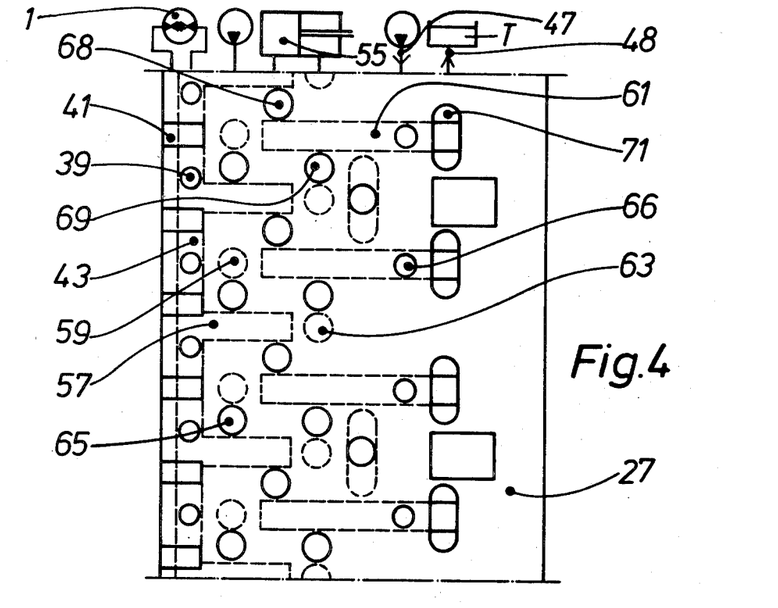
FIG. 4 is a planar projection of the outer cylindrical surfaces of the valve elements shown in FIG. 1 associated with the control valve in a neutral position showing in solid line the control passages of the outer rotary slide valve element with the cooperating control passages of the inner rotary slide valve element shown in dotted line, the control passages being symbolically shown connected to the other components of the hydrostatic steering system.

FIG. 4 illustrates in solid line the flow passage layout of the outer rotary slide valve element 27 wherein the aforementioned apertures 41 are shown in the form of relatively short longitudinal grooves which open into the chamber 36 as aforementioned. The control apertures 39 which extend radially through the valve element as aforementioned are located centrally between the apertures 41. Radial passage openings 65 and 66 are formed in the outer rotary slide valve element and are so arranged at axial intervals for fluid communication through annular grooves 46 or 45 in the housing with the high pressure conduit 47. Radial passage openings 68 and 69 also formed in the outer valve element 27 in non-aligned relationship to each other are in fluid communication through annular grooves 52 and 53 in the housing with the two operating chambers of the fluid steering motor 55. Finally, radial passage openings 71 in the outer valve element, having an oblong shape extending in a circumferential direction, are in fluid communication with the return conduit 48 through annular groove 50 in the housing. The grooves 61 formed in the inner valve element 28 as aforementioned and shown by dotted line in FIG. 4, are in fluid communication with the openings 71 in all steering positions of the control valve and with the return conduit 48. Accordingly, the grooves 61 and openings 48 form part of the fluid return line to reservoir tank 51.

With continued reference to FIG. 4 corresponding to the neutral position of the control valve, operation of the first embodiment of the invention as hereinbefore described will become apparent. In the neutral position as shown, operating fluid flows from the high pressure conduit 47 through the radial passage openings 66 into the longitudinal grooves 61 of the inner valve element 28 and through the openings 71 in the outer valve element 27 into the return conduit 48. In response to steering displacement of the inner valve element 28, the foregoing fluid recirculating flow path for the neutral position is progressively restricted and finally blocked.

Figure 6:
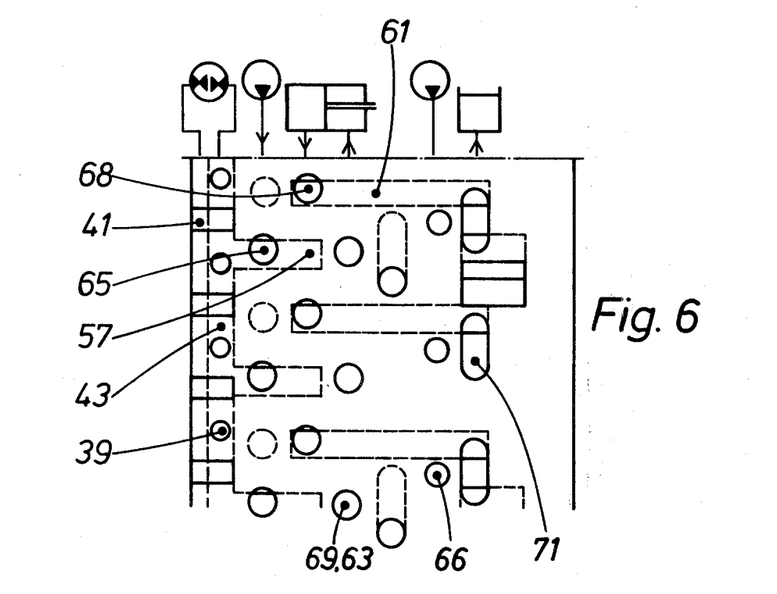
FIGS. 6 and 7 are planar projections of the outer cylindrical surface of the rotary slide valve elements similar to FIG. 4, but in extreme opposite steering positions displaced from the neutral position corresponding to that of FIG. 4.
Figure 7:
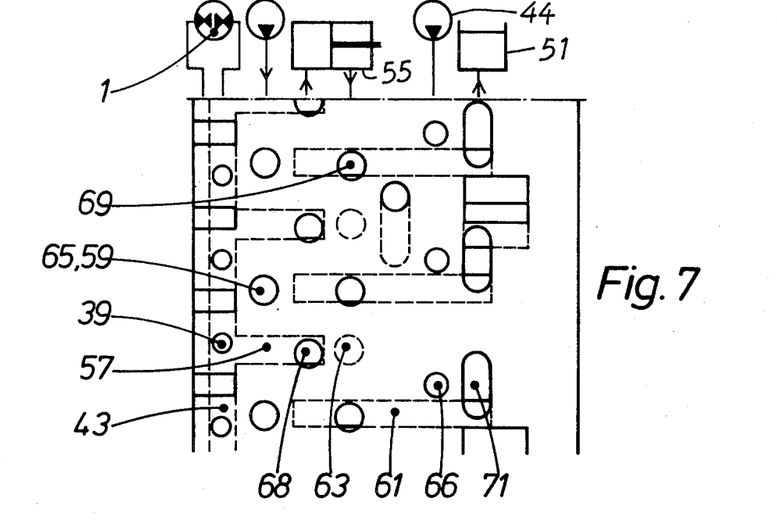

FIGS. 6 and 7 show the relative positions of the rotary slide valve elements when displaced from the neutral position in opposite directions during steering operation. Opposite extreme positions are shown so as to simplify an understanding of operation. The recirculating flow path that is unrestricted in the neutral position of the valve, is restricted by virtue of the fact that the openings 66 in the outer valve element 27 are no longer aligned with the underlying longitudinal grooves 61 in the inner valve element. In the steering position shown in FIG. 6, pressurized fluid from line 47 flows through the openings 65 in the outer rotary slide valve element into the longitudinal grooves 57 of the inner rotary slide valve element. The fluid is thereby conducted to the annular groove 43 of the inner valve element from which the fluid passes through the control apertures 39 in the outer rotary slide valve element and through some of the axial flow passages 21 in the housing 17 to one group of expanding fluid displacing pockets 13. The operating fluid returning from the other group of contracting pockets 13 flows through the other housing passages 21 and the control apertures 41 of the outer rotary slide valve element to the chamber 36 and inner chamber 37 from which the fluid is conducted through the openings 63 in the inner rotary slide valve element and the openings 69 in the outer rotary slide valve element aligned therewith to one of the operating chambers of the steering motor 55. The operating fluid flows from the other operating chamber of the steering motor to the openings 68 in the outer rotary slide valve element to the longitudinal grooves 61 in the inner rotary slide valve element from which the fluid is conducted to the return line.

The other external steering position for the rotary slide valve elements is shown in FIG. 7 wherein the pressure fluid flows from the high pressure conduit 47 through the aligned openings 65 and 59 to the inner chamber 37, through the chamber 36 and the control apertures 41 in the outer valve element to one group of expanding pockets 13. The pressurized fluid returning from the other group of contracting pockets 13 reaches the annular groove 43 through the apertures 39 in the outer rotary slide valve element and from said annular groove 43 into the longitudinal grooves 57 from which the fluid flows through the openings 68 in the outer rotary slide valve element to one of the operating chambers of the steering motor 55 opposite to the chamber receiving pressurized fluid as described with respect to FIG. 6. Outflow of fluid from the other operating chamber of the steering motor returns through the openings 69 in the outer rotary slide valve element to the longitudinal grooves 61 in the inner rotary slide valve element and is thereby returned to the return line 48.

Figure 8:
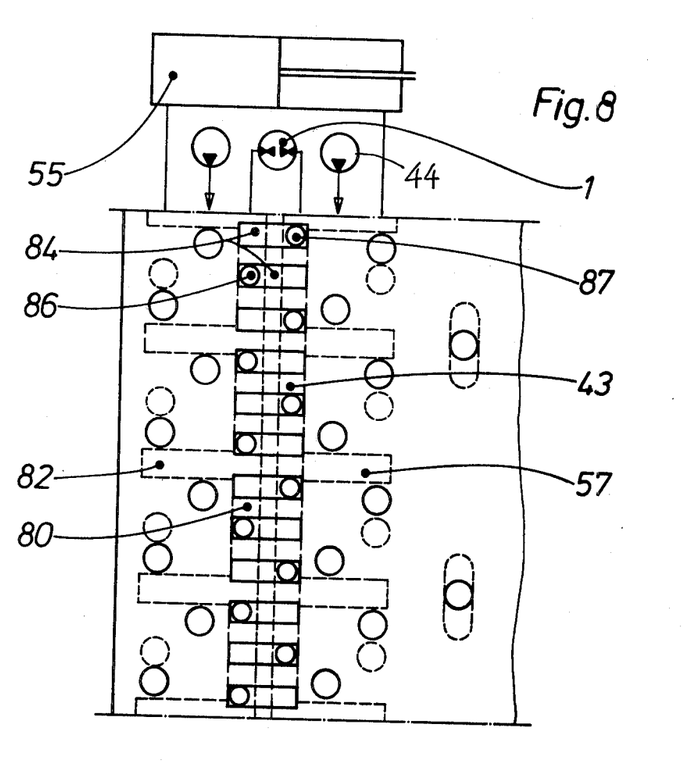
FIG. 8 is a planar projection of the external surface of the rotary slide valve elements in a neutral position similar to that of FIG. 4, but corresponding to a second embodiment.
Figure 9:
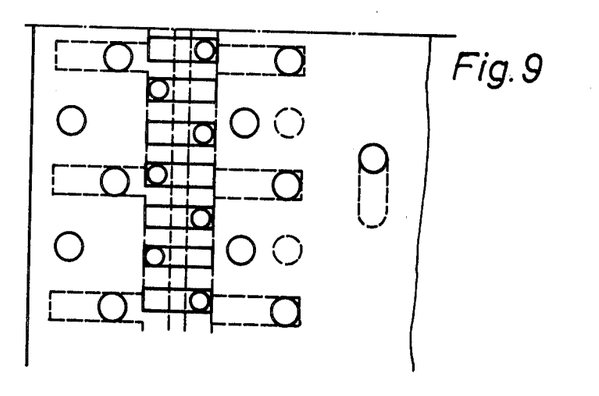
FIG. 9 is a partial planar projection of the rotary slide valve element as shown in FIG. 8, but in an extreme steering position.
Figure 10:
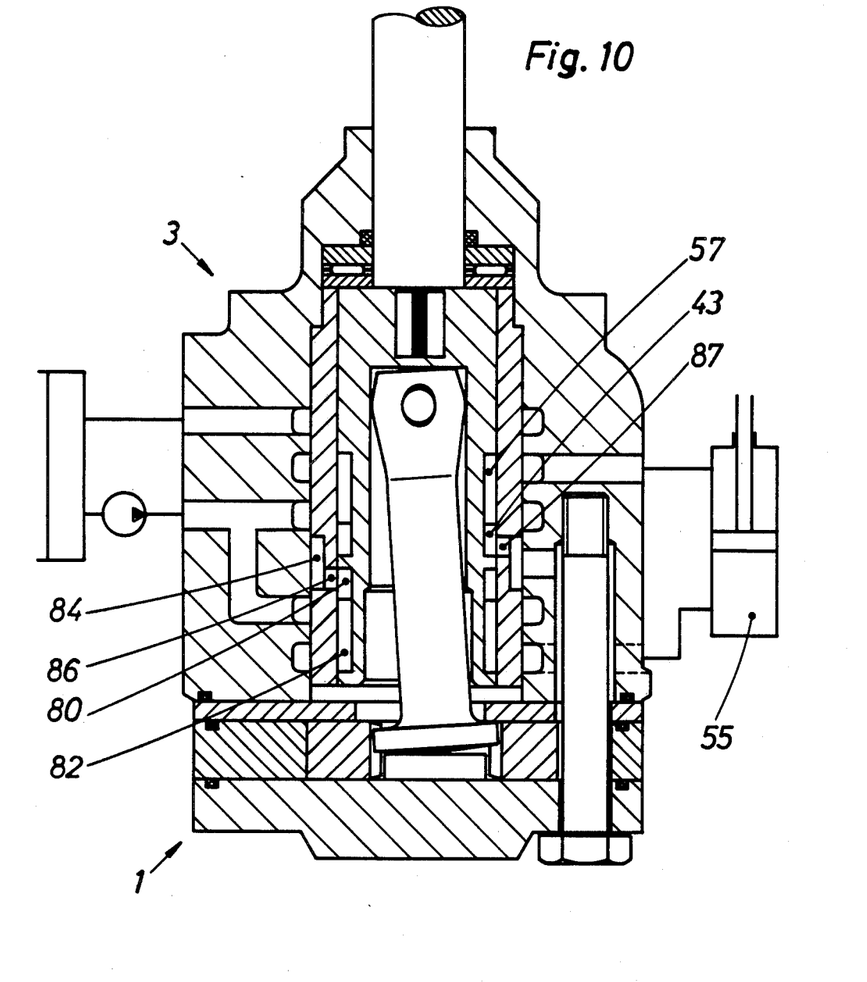
FIG. 10 is a longitudinal side section view of the second embodiment of the control valve corresponding to that of FIGS. 8 and 9.

FIGS. 8 and 9 illustrate a modified flow passage arrangement for the valve elements in accordance with a second embodiment of the invention wherein one collector manifold is formed by the annular groove 43 in the outer surface of the inner rotary valve element. The other collector manifold is formed by an additional annular groove 80 provided in the outer surface of the inner rotary slide valve element. Angularly spaced, longitudinal grooves 82 communicate with the additional annular groove 80. Thus, the inner rotary valve element is provided on its outer surface with two annular grooves 80 and 43' with which the longitudinal grooves 82 and 57 communicate. The outer surface of the outer rotary slide valve element is provided with a second series of control apertures 84 in the form of relatively short longitudinal grooves. The control apertures 84 are connected alternately through openings 86 and 87 with the annular grooves 80 or 43 in the inner valve element. The first series of control apertures 23 formed in the housing as shown in FIGS. 8 and 9, is disposed in alignment with the second series of control apertures 84. Additional control passages are disposed in both the inner and outer rotary slide valve elements to accommodate a reversal of flow directions. The operational method associated with FIGS. 8 and 9 correspond to that of the first embodiment described with respect to FIGS. 4 and 5 except that the collector manifold formed by the annular groove 80 in the second embodiment replaces the collector manifold formed by the chambers 36 and 37 associated with the first embodiment.

What is claimed is:

1. In a hydrostatic steering system comprising a gear pump (1) having a rotor (11) and a stator (5) with expanding and contracting fluid displacing pockets formed therein between gear teeth of the rotor, a fluid steering motor (55), and a control valve (3) including two valve elements (27 and 28), housing means (17) rotatably mounting said valve elements for relative rotation to control flow of fluid through the gear pump to the fluid steering motor, means (34) operatively connecting one of said valve elements (27) to the gear pump for controlling flow of fluid to the expanding and contracting pockets of the gear pump to the fluid steering motor, a driving shaft (32) connected to the other of the valve elements (28), passage means (21), extending through the housing means for conducting fluid between the gear pump and said one of the valve elements (27), said one of the valve elements (27) being provided with a series of angularly spaced control apertures (39, 41 84) equal in number to said rotor gear teeth adapted to communicate with said passage means, the improvement residing in two collector manifolds (38, 43) in fluid communication with all of the pockets of the gear pump, one of the collector manifolds (38) establishing continuous fluid communication between all of said pockets of the gear pump and alternate ones (41) of the control apertures of said series and directional control means (57, 61, 63, 65, 68, 82) formed in said valve elements in fluid communication with said collector manifolds for effecting a reversal in fluid direction through the control valve in response to relative angular displacement of the valve elements by the driving shaft in opposite steering directions by an amount equal to the circular pitch of the rotor gear teeth, said other of the valve elements (28) having a radially outer bearing surface with which alternate ones of the control apertures (39) in said one of the valve elements (27) is in communication, one of said collector manifolds (43) being in the form of an annular groove in said radially outer surface of said other of the valve elements (28), the other of the collector manifolds being formed by a chamber (36) axially between the pump and the control valve in fluid communication with some of the control apertures (41) and an inner chamber (37) enclosed by said other of the valve elements (28), said directional control passage means including longitudinal grooves (57) formed in the radially outer surface of said other of the valve elements in communication with the annular groove (43) constituting said one of the collector manifolds and radial control passages (65, 68) extending through said one of the valve elements cooperating with said longitudinal grooves to directionally control the flow of fluid to and from the fluid steering motor.

2. In a hydrostatic steering system including a steering control valve (3) having a housing (17), within which passages (21) are formed, relatively rotatable cylindrical valve elements (27, 28) mounted in the housing, a fluid motor (55), a gear pump (1) having a stator gear (7), a piston gear (9) with teeth in mesh with the stator gear and means operatively connecting one of the valve elements (27) to the piston gear for expanding and contracting pockets (13) formed between said gears in response to rotation of the other of the valve elements causing flow of fluid to and from said fluid motor (55) through said passages (21) in the housing and valve flow passage means in the valve elements rendered operative for controlling said flow of fluid in opposite directions between the fluid motor and the gear pump, the improvement residing in fluid collecting means (38, 43, 80, 43') establishing continuous fluid communication between the housing passages (21) and the valve flow passage means for rendering the valve flow passage means operative in response to relative angular rotation of the valve elements in opposite directions between angular limits dependent solely on the circular pitch of the teeth of the piston gear, said valve flow passage means including a series of angularly shaped control passages (39, 41) equal in number to said teeth conducting fluid to and from all of said pockets through the fluid collecting means and the housing passages.

3. In a hydrostatic steering device having a flow metering gear pump (1) provided with a fluid displacing rotor (9) inducing flow along a predetermined number of effective flow paths, a servomotor (55) and control valve means (3) for distributing flow to said servomotor (55) including a housing (17) and a pair of relatively rotatable valve elements (27 and 28) rotatably mounted in the housing, the improvement residing in passage means for conducting flow without division of said effective flow paths, comprising a pair of fluid collecting manifolds (38, 43, 80, 43') to which all of the effective flow paths extend in common, and two series of flow distributing passages (39, 41) formed in the valve elements respectively in fluid communication with said manifolds, the flow distributing passages in each of said series being equal in number to said predetermined number of effective flow paths.

* * * * *